United States Patent
Berg

[11] 3,748,917
[45] July 31, 1973

[54] TRANSMISSION BELT

[76] Inventor: Winfred M. Berg, 89 Grant Ave., East Rockaway, N.Y. 11518

[22] Filed: Nov. 5, 1971

[21] Appl. No.: 195,972

[52] U.S. Cl. .............................. 74/231 R, 74/231 J
[51] Int. Cl. ............................ F16g 1/28, F16g 1/00
[58] Field of Search ...................... 74/231 J, 231 C, 74/231 R, 246, 243 R

[56] References Cited
UNITED STATES PATENTS

| | | | |
|---|---|---|---|
| 2,613,546 | 10/1952 | Jorgensen | 74/246 |
| 3,026,737 | 3/1962 | Berg | 74/231 C X |
| 1,293,123 | 2/1919 | Konetsky | 74/243 R |
| 3,108,488 | 10/1963 | Huszar | 74/46 S |
| 3,394,608 | 7/1968 | Johnson | 74/246 |
| 3,517,565 | 6/1970 | Smith | 74/231 R |
| 3,540,301 | 11/1970 | Bartz | 74/231 C |

Primary Examiner—Leonard H. Gerin
Attorney—Edward Halle

[57] ABSTRACT

A transmission belt for use with sprockets and gears featuring an elongated body portion comprising: at least one elongated flexible body element in the form of a cable or the like, with a soft plastic jacket or covering, and a series of transmission pins made of hard plastic, being generally perpendicular to the cable and molded over the soft plastic covering, in which the diameter of the pins is greater than the outside diameter of the cable.

18 Claims, 16 Drawing Figures

PATENTED JUL 31 1973 3,748,917

INVENTOR.
WINFRED M. BERG

BY Edward Halle
ATTORNEY.

INVENTOR.
WINFRED M. BERG
BY Edward Halle
ATTORNEY.

3,748,917

TRANSMISSION BELT

SUMMARY OF THE INVENTION

This invention relates to transmission drive belts generally used in connection with sprockets or gears.

It is an object of this invention to provide a positive drive transmission belt with no slip, which has great cable strength. It is another object of this invention to provide such a transmission belt which requires no lubrication and eliminates linkage backlash, as well as backlash in the drive system.

Still another object of this invention is to provide such a transmission belt which has a silent drive.

A further object is to provide a transmission belt sufficiently flexible to drive in a system having a plurality of axes, for example from a vertical sprocket to a horizontal, to a vertical sprocket to an obliquely held sprocket, and so on. Such a belt would have the further advantage of being usable on parallel shafts for direct drive or a reverse drive by crossing the belt and such a belt would be suitable for use with elliptical gears and drives. Another object in providing a flexible belt is to provide a drive link between sprockets which need not necessarily be in exact alignment.

A further object is to provide a transmission belt which provides positive drive from either side of the belt, top or bottom, and which may be used in rack and pinion arrangement. Further objects and advantages will appear in the specification herein below.

DETAILED DESCRIPTION OF THE INVENTION

The invention is illustrated in the accompanying drawings in which.

Similar numerals refer to similar parts throughout the several views.

Figure 1:
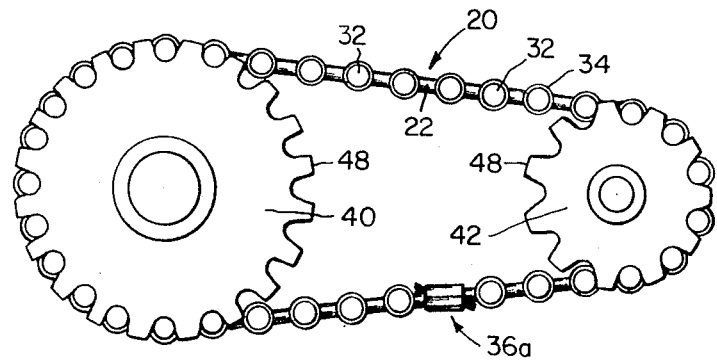
FIG. 1 is an elevational view.
Figure 2:
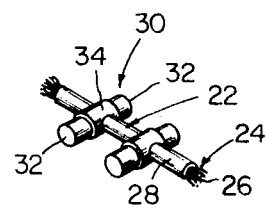
FIG. 2 is a perspective view of a portion of the belt of FIG. 1.

The main body portion of the invention as shown in belt 20 comprises at least one elongated flexible body element 22 which, in turn, comprises a central cable 24 made up of multiple strands 26 of twisted steel, wire or other suitable material. A plastic jacket 28, preferably of soft flexible grade plastic such as polyurethane, or any other suitable material, is extruded around the cable by any of the well known means known to the art. After the body of the belt 20 is completed, transmission pin means in assemblies 30 comprising pins 32 are molded to the body portion of the belt 20, being spaced at desired intervals.

The transmission pin means assemblies 30 are made of a hard plastic provided by injection molding operation or operations well known in the art. It has been found that the use of hard material on soft material in combination to provide a transmission belt 20 of the foregoing description and construction has many advantages, as aforesaid.

A principal advantage is the great flexibility of the body portion 20 which is limited only bh the proximity of the rigid pin assemblies 30, permitting the use of the belt 20 on extremely small sprockets. The hard and soft material constructions provides means for firmly fixing the transmission pin means assemblies 30 to the body portion 20.

The pins 32 extend generally perpendicularly from the body portion 20, and in the first form of construction shown in FIGS. 1 through 4 of the drawings, are molded integrally with the collar-like portion 34 from which the pins 32 extend.

Figure 5:
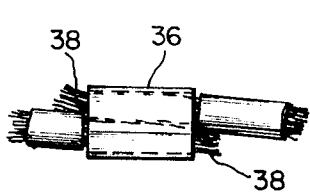
FIG. 5 is an enlarged elevational detail comprising cable connecting means of the invention.
Figure 3:
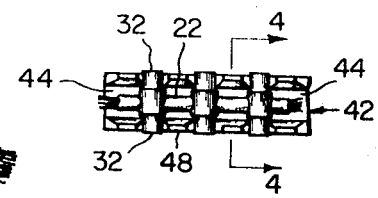
FIG. 3 is a top plan view of a portion of the belt as shown in FIG. 1.
Figure 6:
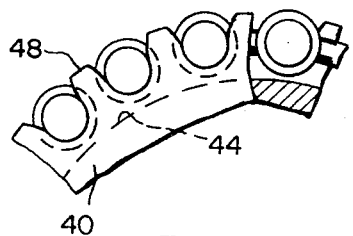
FIG. 6 is an enlarged elevational detail showing a portion of a belt of the invention meshed in a sprocket, parts of which are in section and parts of which are cut away.
Figure 7:
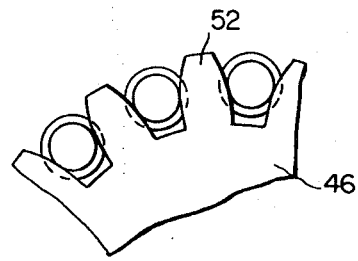
FIG. 7 is an enlarged elevational detail of a gear meshed with a portion of a belt of the invention with parts cut away.

Cable connection means such as a bushing 36 made preferably of steel, but of any other suitable material, are shown in FIG. 5 of the drawings. The cable connecting means is provided to close the belt 20 into an endless loop. It is placed around the ends 38 of cable 24 and crimped to make a fast connection. The crmimped bushing 36 of the connection means may be finished off by molding a pin assembly 30 (not shown) over it, or the bushing 36 may be placed in the space between two pin assemblies 30, or it can take up the space of a pin assembly 30 skipping a space of one pin assembly 30 at the connection point 36a as in FIG. 1. Since an average of 180° of each sprocket are contacted by pin assemblies 30, skipping one set of pins 32 of the series will have no effect.

Figure 4:
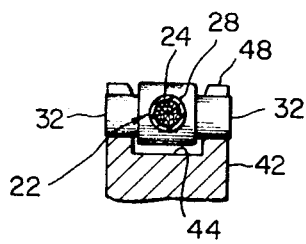
FIG. 4 is an enlarged sectional detail along the lines 4—4 of FIG. 3.

The outside diameter of the pins 32 is greater than the outside diameter of the body portion of the belt 20, as can be seen in FIG. 4. This has the advantage of permitting greater flexibility around small sprockets than would be possible with pins of narrow diameter affixed to a body portion of greater diameter. Placing the pins 32 in an extremely flexible belt 20 provides the advantage of extreme flexibility in all directions. Representation of the flexing ability of belts made in accordance with the invention can be gained from views of FIG. 9 and FIG. 11 of the drawings.

The belt 20 of the first form of the form of the invention is shown with a pair of sprockets 40 and 42 adapted for use with the invention. These may be any type of conventional sprockets being provided with a radial groove 44 along the pitch line of the transmission belt 20. The groove 44 cuts through the teeth 46 and into the bodies of the sprockets 40, 42 and 50 of the invention to provide room for the belt. Although the term "sprockets" is used herein, it is to be understood that the conventional gears 46 with teeth 52 may also be used in the invention with the provision of radial grooves such as grooves 44 or 70, or the like.

Figure 8:
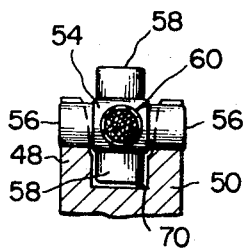
FIG. 8 is a view similar to FIG. 4 illustrating in enlarged detail a second form of transmission belt of the invention.
Figure 9:
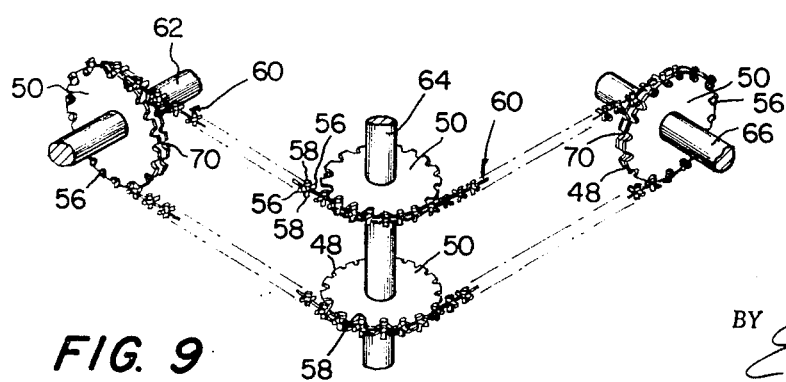
FIG. 9 is a perspective view showing the belt of FIG. 8 of the invention applied to sprockets on three different axes.

A second form of the invention is illustrated in FIGS. 8 and 9 of the drawings. In this form of invention pin assemblies 54 comprise 2 pairs of pins 56 and 58 which are normally perpendicular to the belt 60 and to each other so that the belt 60 may run from a sprocket 50 with a horizontal axis 62 to and around a sprocket 50 with a vertical axis on shaft 64, to and around a sprocket 50 on horizontal shaft 66, back to a sprocket 50 on shaft 64 and around sprocket 50 on shaft 62 again. This forms a drive through three axes X (62), Y (64), and Z (66) with no twisting of the belt 60, thus permitting operation through various angles without multiple gearing. and costly shaft assemblies. The groove 70 of sprocket 50, as shown in FIG. 8, will be relatively deeper than the groove 44 of sprocket 40 and 42 shown on 42 in FIG. 4 in order to accommodate the "off" pair of pins ("in the" 56 or 58) as they pass through the pitch line of the sprocket 50.

Reference to FIG. 9 will show that as the belt 60 passes around the sprockets 50 sometimes the pin 56 will be meshing with teeth 48, while pins 58 are "off" sprocket in groove 70 (as in sprockets 50 on shafts 62 and 66) and sometimes pins 56 will be "off" sprocket while pins 58 will be "on" sprocket (as in sprockets 50 on shaft 64). In this form of the invention the pins 56 and 58 extend radially from the belt 60 with the radius of each pin being an equal distance apart. The form illustrated shows radii equidistant at right angles to each other.

Figure 10:
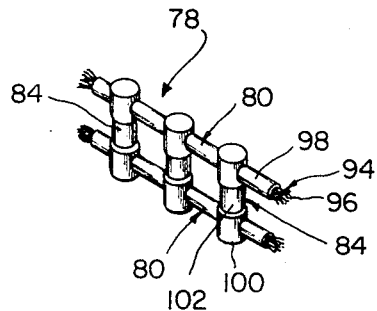
FIG. 10 is a perspective view of a portion of a belt illustrating a third form of the invention.
Figure 11:
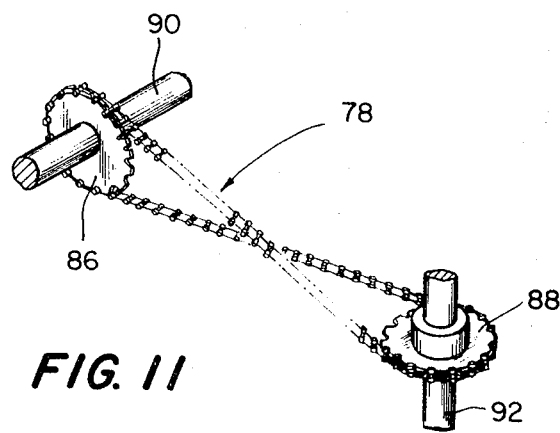
FIG. 11 is a perspective view showing the belt of FIG. 10 applied to a pair of sprockets in different axes.

In FIGS. 10 and 11 a third form of invention is shown in which a pair of elongated flexible body elements 80 are connected by pin assemblies 84. Such a belt 78 will be flexible enough to connect two sprockets 86 and 88 rotating in perpendicular planes on shafts 90 and 92 with axes perpendicular to each other.

The pin means assemblies 84 are of the same type of hard plastic construction of the mentioned forms of the invention and the body member 80 is similar to body member 22 which has the soft plastic coating, or jacket 28. The body members 80 comprise a similar central cable 94 of strands 96 covered by a similar soft plastic jacket 98. The pin means assemblies 84 are of hard plastic molded over the soft plastic of the jackets 98, and have collar portions 100 between which the pins 102 extend laterally. With this type of pin 102 the sprockets may be used with or without the radial groove 44.

Figure 12:
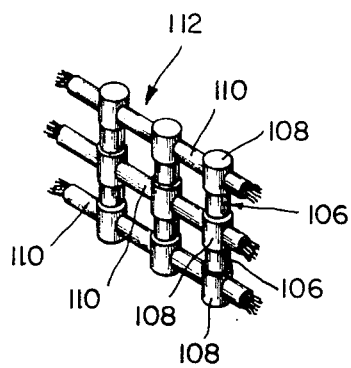
FIG. 12 is a view similar to FIG. 10 showing a fourth form of the invention.
Figure 13:
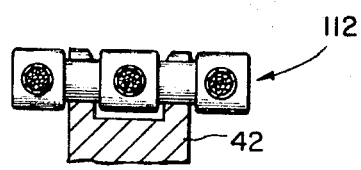
FIG. 13 is a view similar to FIG. 4 illustrating the form of belt shown in FIG. 12 meshed in a sprocket.

A fourth form of invention is shown in FIGS. 12 and 13. In this form all of the elements are constructed similarly to the previous forms except that the pin assemblies 106 have three collar portions 108 each molded to a flexible elongated body portion 110 to form a three strand belt 112 which is adapted for use with a sprocket 42 as shown in FIG. 13.

Figure 14:
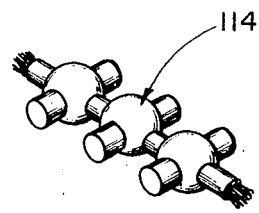
FIG. 14 is a perspective view illustrating a belt as in the first form of invention modified by having a spherical collar formation.
Figure 15:
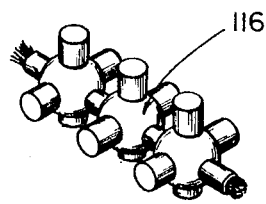
FIG. 15 is a perspective view illustrating the second form of invention modified by having a spherical collar.

In FIGS. 14 and 15 pin assemblies of the first and second forms of the invention are shown with spherical collars 114 and 116, respectively. Any form of the invention can be made with collars in the form of a round ball or sphere. It has been found that such a construction has the advantage of smoother running qualities especially where tolerances within grooves such as grooves 44 are concerned.

Figure 16:
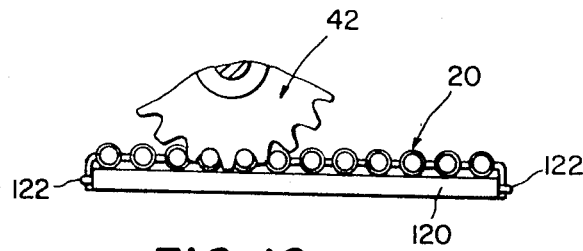
FIG. 16 is an elevational view of a form of invention showing the belt and sprocket of the invention in a rack and pinion arrangement.

Another form of the invention is shown in FIG. 16 in which a rack base 120 is provided with a length of belt of the invention such as belt 20. The belt length 20 is fixed to the base by staples 122 or other fastening means. This forms the "rack". A sprocket 42 of the invention may be used for the "pinion" construction.

Again the term "sprocket" is used herein to cover both conventional sprockets and conventional gears, since the hard plastic pins of the invention will adapt to either sprockets or gears in any form of the invention.

While I have described my invention in its preferred forms there are many forms that it may take and I desire to be protected for all forms coming within the scope of the claims herein below.

I claim:

1. A transmission belt comprising a flexible elongated body portion comprising at least one elongated body element on which a series of transmission pin means are positioned, in which the elongated flexible body element comprises a flexible cable element covered by a plastic jacket of soft flexbile plastic, and in which the transmission pins are comprised of elements extending laterally with relation to said body element, with said pins comprising a hard plastic material and having a larger cross section area than the cross section area of the body element.

2. The transmission belt as claimed in claim 1, in which the transmission pin means are comprised in assemblies of hard plastic, each comprising a pair of transmission pin means extending laterally from opposite sides of said elongated body element.

3. The transmission belt as claimed in claim 2, in which at least one pin assembly comprising a pair of transmission pin means is formed with a hard plastic collar positioned around the elongated body element.

4. The transmission belt as claimed in claim 3, in which the hard plastic collar is molded around the soft plastic of the elongated body element.

5. The transmission belt as claimed in claim 3, in which the hard plastic collar positioned around the elongated body element is spherical and axially positioned around the elongated body element with the pin means extending from said spherical collar.

6. The combination of a transmission belt as claimed in claim 1, with at least one sprocket having a width greater than that of the elongated body element of the belt, having grooved sprocket teeth in which the grooving runs radially.

7. The transmission belt as claimed in claim 1, in which the transmission pins are arranged in at least one transmission pin means assembly comprising a plurality of transmission pin means extending radially on radii equidistant from each other.

8. The transmission belt as claimed in claim 7, in which there are four laterally extending pins at right angles to each other.

9. The transmission belt as claimed in claim 8, in which the transmission pin means assembly comprises a spherical collar positioned around the body element along an axis of the sphere, with the pin means extending from the spherical collar, radially from said axis.

10. The combination of a transmission belt as claimed in claim 8 with at least one sprocket having a width greater than that of the body element of the belt, having grooved sprocket teeth in which the grooving runs radially and dep enough to accommodate the length of a transmission pin means of the belt.

11. The combination as claimed in claim 10 having a plurality of sprockets in which at least one sprocket of the combination rotates in a plane different from the plane in which another sprocket of the combination rotates.

12. The combination as claimed in claim 11, in which at least one sprocket of the combination rotates in a plane substantially perpendicular to a plane in which another sprocket of the combination rotates.

13. The combination of a transmission belt as claimed in claim 9 with at least one sprocket having a width greater than that of the body element of the belt, having grooved sprocket teeth in which the grooving runs radially and depp enough to accommodate the length of a transmission pin means of the belt.

14. A transmission belt as claimed in claim 1 having a pair of elongated flexible body elements with a series of pin means disposed laterally between the body elements.

15. The transmission belt as claimed in claim 14, in which the pin means are comprised in pin assemblies having spherical collar portions molded around the elongated body elements substantially at the axes of said spherical collar portions.

16. A transmission belt as claimed in claim 2 having at least two additional elongated body elements in addition to said first mentioned elongated body element from which the pins extend laterally, said additional body elements being disposed on either side of the belt, said first body element being connected to outward portions of said pin means.

17. The transmission belt as claimed in claim 16, in which the pin means are comprised in pin assemblies having spherical collar portions molded around the elongated body elements substantially at the axes of said spherical collar portions.

18. A rack and pinion arrangement comprising the combination claimed in claim 6, in which at least a portion of the belt is fixed to a pinion base, and the sprocket is meshed to the pin means of the belt.

* * * * *